United States Patent [19]

Leder et al.

[11] 4,164,556

[45] Aug. 14, 1979

[54] METHOD OF PRODUCING SULFUR FROM SULFUR DIOXIDE

[75] Inventors: Frederic Leder, South Orange; Robert P. Cahn, Millburn, both of N.J.

[73] Assignee: Exxon Research & Engineering Co., Florham Park, N.J.

[21] Appl. No.: 523,705

[22] Filed: Nov. 14, 1974

[51] Int. Cl.$^2$ ............................................. C01B 17/04
[52] U.S. Cl. ..................................................... 423/569
[58] Field of Search ............... 423/569, 570, 574, 576, 423/563, 564

[56] References Cited

U.S. PATENT DOCUMENTS

| | | | |
|---|---|---|---|
| 1,359,114 | 11/1920 | Shiomi | 423/570 |
| 1,771,481 | 6/1926 | Benner et al. | 423/570 |
| 2,388,259 | 11/1945 | Fleming et al. | 423/569 |
| 3,199,955 | 8/1965 | West et al. | 423/570 |
| 3,495,941 | 2/1970 | Van Helden | 425/570 X |
| 3,848,071 | 11/1974 | Groenendaal | 423/574 |
| 3,865,927 | 2/1975 | Watson | 423/570 |

OTHER PUBLICATIONS

"Chemical Abstracts"; vol. 67, 1967, 102,057z.
Kellogg: "Metallurgical Transactions", vol. 2, Aug. 1971, pp. 2161–2169.

*Primary Examiner*—G. O. Peters
*Attorney, Agent, or Firm*—Wayne Hoover

[57] ABSTRACT

A method for producing sulfur from sulfur dioxide. In the broadest embodiment, sulfur is produced by reducing the sulfur dioxide with a reducing gas comprising one or more lower, monohydric alcohols. The reduction may be accomplished either thermally or catalytically and the principal products obtained will be elemental sulfur and/or hydrogen sulfide, depending principally upon the particular conditions and relative reactive concentrations actually employed and in some cases, at least, some carbon oxysulfide will be produced. In the broadest embodiment, the reduction, and hence, the sulfur production will be accomplished in a single stage. In the more preferred embodiments, however, the production will be accomplished in a plurality of stages and, in a most preferred embodiment, the sulfur dioxide is first contacted with methanol under conditions such that the molar ratio of the hydrogen sulfide and carbon oxysulfide actually produced to the unconverted sulfur dioxide is within the range from about 1.8:1 to about 2.2:1. The $H_2S$, COS and $SO_2$ will then be further reacted in one or more catalytic converters so as to increase the sulfur yield. Conventional Claus plant equipment can be used to effect this further conversion.

29 Claims, 2 Drawing Figures

METHOD OF PRODUCING SULFUR FROM SULFUR DIOXIDE

BACKGROUND OF THE INVENTION

This invention relates to a method for producing sulfur from sulfur dioxide. More particularly, this invention relates to a process for the production of sulfur from sulfur dioxide wherein a lower monohydric alcohol is employed as a reducing agent. As is well known, sulfur dioxide is a most undesirable pollutant emitted to the atmosphere as a component in a large number of process, flue gas and/or combustion gas streams conventionally vented to the atmosphere. As is also well known, considerable effort has been expended in recent years to develop both an effective and economical process for separating sulfur dioxide from such streams. Mere separation from these gas streams is, however, not enough since the $SO_2$, in a gaseous state, cannot be conveniently stored or disposed of. As a result, it has become necessary to convert the $SO_2$ to a non-pollutant form which itself can be either easily stored or productively used.

One such conversion is accomplished by reducing the sulfur dioxide to either sulfur and oxygen or to sulfur and water and, heretofore, several processes have been proposed for this purpose. Generally, these processes involve the use of either a gaseous or solid reducing agent and some have been found quite effective for this purpose. In this regard, it should be noted that those processes using a non-carbonaceous reducing agent such as hydrogen generally lead to the production of a high quality sulfur which can be sold commercially and used for any of the purposes for which sulfur is normally employed. The principal problem associating with these processes, however, is that hydrogen is not generally readily available at those sites where sulfur dioxide is conventionally vented to the atmosphere. Moreover hydrogen cannot be conveniently shipped and stored at these sites due primarily to the large shipping and storage capacities which would be required and/or the pressurized equipment which would be necessary therefor. As a result, if hydrogen were to be used to produce sulfur from the sulfur dioxide normally vented to the atmosphere, the same would, generally, be prepared at the site from another material, such as methane, LPG or the like, which is more conveniently available at the side. The problem with this approach is, of course, that an increased captial investment would be required to effectively separate the normally vented sulfur dioxide and, since an additional operating step would be required for such separation, the continuing operating cost would be increased.

Other sulfur producing processes, on the other hand, and particularly those employing a carbonaceous reducing agent, such as methane, LPG or the like, do not, generally, yield a high purity sulfur which would be useful in those areas wherein sulfur is normally employed. In this regard, it should be noted that the use of a carbonaceous reducing agent is, generally, accompanied with an undesirable tendency to form soot, carbon oxysulfide and carbon disulfide as by-products of the reducing reaction. These products are, of course, undesirable in that all will, to some extent, adversely affect the purity of the more desirable sulfur product or products. Moreover, soot will, generally, discolor the elemental sulfur product, while carbon disulfide, which is not easily converted to elemental sulfur, will decrease the yield thereof.

In light of the deficiencies associated with the prior art processes, it is believed that the need for an improved process which employs a reducing agent which is either readily available or easily stored at the site and which will yield a high purity sulfur product which can be sold commercially and used in those areas where sulfur is normally employed is believed to be readily apparent.

SUMMARY OF THE INVENTION

It has now been surprisingly discovered that the foregoing and other disadvantages associated with the prior art processes can be avoided with the process of this invention. It is, therefore, an object of this invention to provide an improved process for the production of sulfur from sulfur dioxide. It is another object of this invention to provide such a process wherein the reducing agent employed therein may be easily and conveniently stored at a site where sulfur dioxide is separated from a gas stream vented to the atmosphere. It is still another object of this invention to provide such a process which will yield a high purity sulfur which can be sold commercially. These and other objects and advantages will become apparent from the disclosure set forth hereinafter.

In accordance with the present invention, the foregoing and other objects and advantages are accomplished, with a process wherein the sulfur dioxide is at least partially reduced with a gas comprising one or more lower monohydric alcohols. As pointed out more fully hereinafter, this initial, partial reduction may be accomplished either thermally or catalytically. As is also pointed out more fully hereinafter, this initial or partial reduction may be followed by a further conversion of unconverted sulfur dioxide and any hydrogen sulfide and/or carbon oxysulfide produced during the first step so as to maximize the yield of sulfur. As is also pointed out more fully hereinafter, the initial or partial reduction may be controlled such that the mole ratio of hydrogen sulfide plus any carbon oxysulfide produced to unreacted sulfur dioxide is within the range from about 1.8:1 to about 2.2:1, and the gas stream containing hydrogen sulfide, carbon oxysulfide and sulfur dioxide in this ratio fed to a catalytic treatment such as in a conventional Claus plant so as to maximize sulfur production from the sulfur dioxide feed.

DETAILED DESCRIPTION OF THE INVENTION

Figure 2:
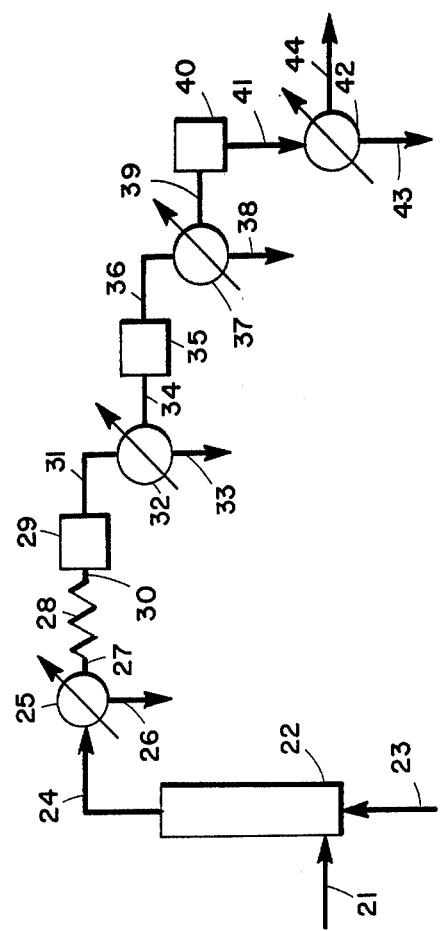
FIG. 2 is a schematic flow diagram of a multiple stage conversion process within the scope of the present invention.

Broadly, the method of producing sulfur from sulfur dioxide of this invention can be used to produce sulfur from sulfur dioxide derived from essentially any source. Such sources include, but are not necessarily limited to, flue gases, other combustion gases, gases obtained from acid sludge decomposition, smelter gas and the like. Generally, however, the sulfur dioxide will first be separated from these gases, which gases will, generally, contain oxygen and/or other materials, which might interfere with the reduction, with methods known in the prior art, and then contacted with a reducing gas comprising one or more lower, monohydric alcohols. Generally, then, the reduction will be accomplished with a gas stream or gaseous mixture comprising sulfur dioxide, generally at a higher concentration then in the source gas and, generally, free of undesirable components such as oxygen and the like. The actual concentration of sulfur dioxide in the stream being treated is, of course, not critical. Nothwithstanding this, however, it is desirable to have the sulfur dioxide concentration as high as possible so as to minimize heat requirements. For this reason, then, the sulfur dioxide concentration in the gaseous mixture to be treated should be at least 10 mole percent, preferably at least 20 mole percent and most preferably at least 50 mole percent.

The method of producing sulfur of this invention is particularly useful in producing sulfur from sulfur dioxide obtained by the regeneration of a selective sulfur dioxide absorbent and particularly such absorbents when the same are used in either a solid or liquid (solution) stage. Flue gas desulfurization processes employing both types of selective sorbents are, of course, well known in the prior art and need not be described herein. Generally, the regeneration off-gas from any one of these processes would contain at least about 10 percent by volume of sulfur dioxide, plus small amounts of reducing components. Other, similar, sulfur dioxide rich gas streams could also be treated according to this invention. Preferably, however, the sulfur dioxide-rich stream treated in accordance with this invention will be substantially devoid of free oxygen. In this regard, it should be noted that while such streams containing free oxygen might be treated according to the present invention an excess of reducing agent would be required to offset the adverse affect of such oxygen. For this reason, then, it is most preferred that the gas stream treated in accordance with this invention contain no more than about 1000 ppm oxygen.

In general any of the lower, monohydric alcohol; i.e. those containing from 1 to 4 carbon atoms therein, could be used either separately or in combination to effect the initial and partial reduction of the $SO_2$ in the method of this invention. As the number of carbon atoms increases, however, the risk of soot contamination of the sulfur product increases. Moreover, when the higher alcohols, even within the lower range herein specified, are employed, the production of detrimental and/or undesirable compounds such as $CS_2$ is increased. For this reason, then, it is most preferred that methanol be employed as the sole constituent in the reducing gas. This preference is also enhanced by the fact that methanol is most readily volatilized and most easily and conveniently used as the reducing gas. Also, so as to further reduce the possibility of soot formation and subsequent contamination as a result thereof, the reducing gas stream should be free of excess carbon monoxide and/or hydrocarbons. In this regard, it should be noted that for purposes of this disclosure, excess carbon monoxide shall mean any carbon monoxide in excess of that which might be obtained as the result of decomposition of the methanol during vaporization.

The principal chemical reactions involved in the initial, partial reduction of sulfur dioxide with a lower alcohol and particularly methanol are illustrated by the following equations:

$$SO_2 + CH_3OH \rightarrow H_2S + H_2O + CO_2 \quad (1)$$

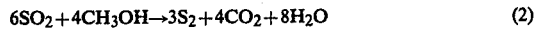

$$6SO_2 + 4CH_3OH \rightarrow 3S_2 + 4CO_2 + 8H_2O \quad (2)$$

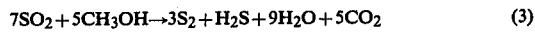

$$7SO_2 + 5CH_3OH \rightarrow 3S_2 + H_2S + 9H_2O + 5CO_2 \quad (3)$$

Equation (3) is, of course, simply the sum of equations (1) and (2) and the equations shown illustrate only the principal reactions involved in the initial or partial reduction of the sulfur dioxide. In this regard, it should be noted that those reactions which are possible and which might lead to the production of COS and $CS_2$ have not been shown. The equations as illustrated, however, clearly show that methanol can be used to convert a substantial portion of the sulfur dioxide to sulfur. The equations also show that hydrogen sulfide is a possible reaction product. That some sulfur dioxide could pass through unconverted is believed to be readily apparent. As pointed out more fully hereinafter, then, the amount of hydrogen sulfide actually produced as well as the amount of sulfur dioxide passing through unconverted can be controlled such that the molar ratio of the two are ideally suited to further reaction leading to a stoichiometric conversion of the initial sulfur dioxide to sulfur. Also, to the extent that COS is produced and will react with $SO_2$ in the same manner as $H_2S$ as the result of hydrolysis to $H_2S$, the combined yield of $H_2S$ and COS can similarly be controlled such that the molar ratio of the combined $H_2S$ and COS and the unconverted $SO_2$ is substantially that which would be required for a stoichiometric conversion of the unconverted $SO_2$ through a reaction with $H_2S$.

As in the case of other sulfur dioxide reduction reactions, the reduction with methanol and/or other lower alcohols is highly exothermic. It is, then, possible to effect the reduction thermally and autogenously (autothermally) through a proper control of reactant concentrations and inlet temperatures. Generally, the reduction will proceed thermally at a temperature above about 1000° F. and preferably at a temperature within the range from about 1500° to about 2200° F. and the same will proceed autogenously with feed at a lower temperature when the heat of reaction is equal to the sum of any heat loss from the reactor plus any change in the sensible heat of the components fed to the reactor. The compositions and inlet temperatures may then be varied to achieve any reaction temperature within the stated range and, as indicated, supra, the temperature in the reduction reactor will be determined, primarily, by the concentrations of alcohol and sulfur dioxide in the feed streams and by the respective inlet temperatures of these streams. Preferably, the feed stream will have sufficient concentrations of alcohol and sulfur dioxide such that the reactor does not require extraneous heat, e.g., hot combustion gases or external fuel and air, except during start-up, in order to maintain a self-sustaining reaction. Moreover, the process will not depend upon molecular oxygen contained in either feed streams to supply heat, since ordinarily both feed streams, i.e., the alcohol stream and the sulfur dioxide stream, are essentially devoid of molecular oxygen.

It will, of course, be appreciated that the autothermal reaction can be carried out at any desired pressure ranging from a subatmospheric pressure through a slightly superatmospheric pressure (e.g., about 5-10 psig in the thermal reactor) sufficient to overcome the pressure drop in the process to several atmospheres. It will also be appreciated that the process gas stream produced in the reduction reactor can be cooled, preferably in a waste heat boiler, to condense elemental sulfur.

When dilute feed streams, i.e., either the alcohol containing gas stream or the sulfur dioxide containing gas stream or both, are used, difficulty may be encountered in maintaining a self-sutaining reaction in the thermal reactor. In these situations, thermal reduction can still be achieved, but extraneous heat will be required so as to maintain the reduction temperature within the aforespecified ranges; viz., above about 1000° F. and preferably within the range from about 1500° to about 2200° F. Alternatively, such dilute streams could be contacted with any of the catalysts known in the prior art to be effective for the reduction of sulfur dioxide with hydrogen. These include, but are not necessarily limited to, the transition metals or transition metal oxides such as chromium, cobalt, nickel, molybdenum, vanadium, manganese, tungsten, palladium and zinc and the oxides thereof. These catalysts, when used will, of course, generally be supported on a suitable carrier such as alumina. Still further examples of suitable catalysts are activated bauxite, silica based catalysts and activated carbon catalysts. Concentrated feed streams may also be contacted in the presence of any one or more of the aforementioned catalyst and the reduction accomplished catalytically therewith. Due to the exothermic nature of the reaction, however, staging and/or cooling would generally be required so as to avoid temperature runaways which might adversely affect any particular catalyst actually used. In either case, i.e., in catalytically treating either dilute or concentrated reactant streams, the reduction temperature will be controlled, generally, within the range from about 300° to about 2000° F. and preferably within the range from about 500° to about 1200° F.

Generally, the reaction between the alcohol-containing gas and the sulfur dioxide-containing gas according to the present invention produces a process gas stream which contains elemental sulfur, hydrogen sulfide, unconverted sulfur dioxide, water vapor and carbon dioxide and the same may also contain minor amounts of other constituents such as carbon oxysulfide and carbon disulfide. The relative concentrations of each will, of course, depend upon the reaction conditions actually employed and the relative concentration of each of the reactants in the feed stream. In any case, however, the product gas stream will be cooled in order to condense elemental sulfur, which sulfur may then be conveniently separated as a liquid. The uncondensed portion of the process stream, which will comprise hydrogen sulfide, sulfur dioxide, water vapor and carbon dioxide and in some cases, at least, carbon oxysulfide, may then be subjected to further treatment such as reaction in a conventional type Claus plant so as to maximize the yield of sulfur. In this regard, and as is well known, the feed to a conventional Claus plant will, generally, contain hydrogen sulfide and sulfur dioxide in a mole ratio of about 2:1 and, in the present process, when COS is present, the same may be treated as equivalent to $H_2S$ in determining this molar ratio since the same will, generally, hydrolyze to $H_2S$ in the subsequent operation. Any deviation from this ratio in the uncondensed portion of the product gas could, then, be corrected with additional $H_2S$ and/or $SO_2$, as required. Alternatively, the relative concentrations of alcohol and sulfur dioxide to the reduction reaction and/or the temperature thereof can be controlled so as to yield the proper $H_2S/SO_2$ or $H_2S+COS/SO_2$ ratio in the product stream and, when this is done this ratio will, generally, be controlled within the range from about 1.8:1 to about 2.2:1 and preferably within a range from about 1.9:1 and 2.1:1.

When the uncondensed portion of the product gas stream is fed to a conventional Claus plant, the same will, generally, be treated in a plurality of catalytic conversion stages in order to convert the hydrogen sulfide and sulfur dioxide contents thereof to elemental sulfur. Each catalytic conversion stage will include a catalytic converter which will, generally, contain a known Claus conversion catalyst, such as alumina or bauxite, followed by a condenser in which the gas stream is cooled and the elemental sulfur condensed and separated as a liquid. Each conversion stage will also generally include a reheater which precedes the catalytic converter, in order to bring the inlet temperature of the gas stream as it enters the catalytic converter up to the desired temperature. In this regard, it should be noted that it is important to maintain the gas temperature above the condensation point of sulfur in the catalytic converters and in all parts of the system except the sulfur condensers.

Generally, the effluent gas from the last catalytic stage will be cooled to condense elemental sulfur, which is in turn removed. The remaining gas; i.e., the tail gas, may be incinerated to convert all sulfur species contained therein; e.g., hydrogen sulfide, elemental sulfur, carbon oxysulfide and carbon disulfide, to sulfur dioxide. In flue gas desulfurization installations, the incinerated product would then, preferably, be recycled to the flue gas stream. Alternatively, the incinerated gas product may be separately treated so as to separate sulfur dioxide therefrom and then vented to the atmosphere or in those cases where the sulfur dioxide content does not exceed proscribed sulfur dioxide concentrations, the same way be vented directly to the atmosphere without such a separation.

As indicated previously, the sulfur dioxide which is treated in accordance with the present invention may be derived from essentially any source. Moreover, the same may contain sulfur trioxide, which trioxide will be reduced to either elemental sulfur or $H_2S$ or both in substantially the same manner as the sulfur dioxide.

In general, the reducing gas used to effect the initial or partial reduction of the sulfur dioxide will contain between about 0.5 and 1.0 moles of the lower monohydric alcohol per mole of sulfur dioxide or per mole of sulfur dioxide and sulfur trioxide when the same is present therein. In this regard, it should be noted that when concentrations of alcohol in the lower portion of the range herein specified or even below the lower limit thereof are used, larger amounts of sulfur dioxide will pass through without reduction, less hydrogen sulfide will be produced and most if not all of the sulfur dioxide which is converted will be converted to elemental sulfur. When alcohol concentrations in the upper portion of the range herein specified or concentrations even above the upper limit are used, less sulfur dioxide will pass through unconverted, more hydrogen sulfide will be produced and less of the sulfur dioxide actually converted will be converted to elemental sulfur. For reasons believed readily apparent, then, little would be gained by operating at concentrations below the lower limit. Similarly, and unless, for one reason or another, one desired to convert the sulfur dioxide principally to hydrogen sulfide, operation above the upper limit of the range would not be favored. For these reasons, then, it is preferred that the initial or partial reduction be effected at a concentration ranging from about 0.6 to about 0.85 moles of alcohol per mole of sulfur dioxide being treated since operation in this manner produces a product gas stream containing hydrogen sulfide and unconverted sulfur dioxide in a relative concentration suitable for further though different treatment designed for the production of elemental sulfur. In a most preferred embodiment, the initial or partial reduction will be accomplished with about ⅔ moles of alcohol per mole of sulfur dioxide being treated so that the molar ratio of hydrogen sulfide plus any carbon oxysulfide to sulfur dioxide in the product gas stream will be about 2:1.

Figure 1:
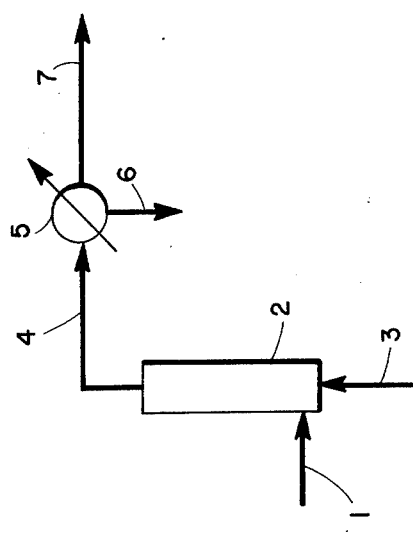
FIG. 1 is a schematic flow diagram of a single stage conversion process within the scope of the present invention.

Having thus broadly described the present invention, it is believed that the same will become even more apparent by reference to the appended drawings. Referring then to FIG. 1, there is shown a flow diagram of a single stage converter within the scope of the present invention. As illustrated in the figure, a sulfur dioxide rich stream is passed through line 1 to a suitable gas contactor 2 and combined with a reducing gas comprising one or more lower monohydric alcohols entering the gas contactor through line 3. In the contactor 2 the desired initial or partial reduction of the sulfur dioxide is effected and the product gas stream containing gaseous sulfur, hydrogen sulfide, sulfur dioxide, water vapor, carbon dioxide and perhaps some carbon oxysulfide and carbon disulfide passes overhead through line 4. As indicated previously, the desired reduction can be effected either thermally or catalytically within the gas contactor 2. When the reduction is effected thermally, the temperature thereof will be controlled by controlling the relative concentrations or amounts of reactants passing through lines 1 and 3 and the temperatures thereof. Heat required to initiate the reaction when an autogenous reaction is desired or sustain the reaction when the conditions employed are not conducive to an autogenous reaction can be supplied, as required, via any suitable means, not illustrated. Alternatively, and when the reduction is to be accomplished catalytically, heat will generally be removed from the cntactor 2 and, again, this may be accomplished by any suitable means, not illustrated. In either case, contacting within the gas contactor can be facilitated by any suitable means known in the prior art such as baffling or inert packing when the reduction is accomplished thermally or simply with a fixed catalyst bed when the reduction is accomplished catalytically. After the product gas stream has been withdrawn from the gas contactor, the same will generally be passed to a condenser 5 so as to condense the gaseous sulfur and the condensed sulfur withdrawn therefrom as a liquid through line 6. The uncondensed portion of the product gases, then, are withdrawn through line 7 and may be subjected to further treatment in a manner illustrated in FIG. 2 or the same may be simply incinerated so as to convert all of the sulfur constituents thereof to sulfur dioxide, which may then be separated and returned to the gas contactor through line 1 or the gas stream may be disposed of in any other suitable manner.

While the single stage method illustrated in FIG. 1 can be used to convert a substantial portion of the sulfur dioxide to sulfur, especially when incineration coupled with separation and recycle of all recovered $SO_2$ is employed, most efficient operation is achieved when the initial or partial reduction is followed by suitable subsequent treatment so as to maximize sulfur production. Such an embodiment is illustrated in FIG. 2. Referring then to the figure, a sulfur dioxide rich stream is fed to a suitable gas contactor 22 through line 21 and combined with a reducing gas comprising one or more lower, monohydric alcohols which enters the contactor 22 through line 23 in a relative concentration as hereinbefore specified. Again, the initial and/or partial reduction can be effected in gas contactor 22 either thermally or catalytically and in any of the manners hereinbefore described. Also, and as has also been previously described, heat may be supplied to or withdrawn from the gas contactor, as required, by any suitable means, not illustrated. In this regard, and to the extent that the subsequent treatment is to be accomplished in a conventional Claus plant, it should be noted that the gas contactor 22 could be, simply, a preheat furnace or burner such as would be conventionally used in a Claus plant. In any case, the product gas stream which would contain the same components as previously described would be withdrawn from the contactor 22 through overhead line 24 and passed through condenser or cooler 25. In the condenser or cooler, gaseous sulfur would be converted to liquid and withdrawn as such through line 26, or the same may act, simply, as a cooler so as to adjust product gas stream temperature, without condensing any product sulfur, to the appropriate level as described hereinafter. The uncondensed portion of the product gas, on the other hand, which will contain hydrogen sulfide, carbon oxysulfide and unconverted sulfur dioxide in relative proportions directly controllable by the conditions employed in effecting the initial or partial reduction will be withdrawn from the condenser through line 27, passed through preheater 28 and then into a first catalytic converter 29 through line 30. As indicated previously, catalytic converter 29 may be a conventional Claus plant converter and the same may contain any one of the catalyst conventionally used therein. In any case, the catalytically treated, uncondensed portion of the product stream will be withdrawn from catalytic converter 29 through line 31 and generally passed through a second condenser 32 so as to condense gaseous sulfur formed in the first catalytic converter. This sulfur will then be withdrawn from the condenser as a liquid through line 33. The uncondensed portion of the gas, on the other hand, will, generally, be withdrawn from condenser 32 through line 34 and passed to a second catalytic converter 35. Generally, catalytic converter 35 would be identical to catalytic converter 29 and again, the same could, simply, be a second catalytic converter of a conventional Claus plant. In any case, the gas stream from the second catalytic converter will be withdrawn therefrom through line 36 and passed through yet another condenser 37 to separate out elemental sulfur. Once condensed, the sulfur will be withdrawn from the condenser as a liquid through line 38. When desired, the uncondensed portion of the gas from condenser 37 can be withdrawn through line 39 and passed through still another catalytic converter 40. Again, catalytic converter 40 could be the same as or a different converter than either of 35 or 29. Gas from this catalytic converter would then be withdrawn through line 41 and passed to yet another condenser 42. Any sulfur condensed is then withdrawn as a liquid through line 43 and the uncondensed portion of the gas withdrawn through line 44. From here, the gas could be subjected to still further treatment or the same could be incinerated and vented to the atmosphere since the sulfur content thereof will, generally, be sufficiently low so as to meet any prescribed pollution standards. If this is not however, the case, the sulfur dioxide in the incinerated gas could be separated by absorption and recycled to feed inlet line 21. It will, of course, be appreciated that the feed to catalytic converters 35 and 40 would, generally, be preheated, when desired, by passing the same to the preheater similar to or identical with that illustrated in connection with the first catalytic converter 29 and designated with reference numeral 28.

PREFERRED EMBODIMENTS

In a preferred embodiment of the present invention, sulfur will be produced from a gaseous mixture comprising at least 20 mole % and most preferably at least 50 mole % sulfur dioxide. The sulfur production will be accomplished by first subjecting the sulfur dioxide in said gas stream to an initial or partial reduction by contacting the same with a gas stream comprising at least 20 mole % methanol and most preferably at least 50 mole % methanol in a manner such that the molar ratio of methanol to $SO_2$ is within the range from about 0.5:1 to about 0.85:1 and most preferably 2:3. The initial or partial reduction will also be accomplished thermally and autogenously at a temperature within the range from about 1500° to about 2200° F. and most preferably at a temperature within the range from about 1600° to about 2000° F. By effecting the initial or partial reduction in this manner, between about 15 and 40% of the sulfur dioxide will be converted to sulfur, between about 10 and 30% will be converted to hydrogen sulfide and between about 15 and 35% will remain unconverted. In the most preferred embodiment, about 35% of the sulfur dioxide will be converted to sulfur during the initial or partial reduction, while 42% will be converted to either hydrogen sulfide and/or carbon oxysulfide and 21% will remain unconverted. At most, only a trace amount of carbon disulfide will be formed. In the preferred embodiment, then, the mole ratio of hydrogen sulfide plus carbon oxysulfide to unconverted sulfur dioxide in the product gas will be between about 1.9:1 to 2.1:1, and in the most preferred embodiment this ratio will be about 2:1. Following the initial or partial reduction, gaseous sulfur will be condensed from the product gas stream and separated therefrom as a liquid. The uncondensed portion of the product gas stream, on the other hand, will then be subjected to further conversion in a plurality of catalytic stages. Preferably, each of the catalytic stages will be operated at a temperature within the range of about 400° to about 700° F. and an activated bauxite catalyst will be used therein. In a most preferred embodiment, the further treatment will be accomplished in accordance with conventional Claus plant technology and the initial or partial reduction will be accomplished by combining the sulfur dioxide and methanol in a conventional Claus plant preheat furnace. Also in the preferred embodiment, the uncondensed portion of the gas stream from the final catalytic converter will be incinerated so as to convert all of the sulfur constituents thereof to sulfur dioxide. The sulfur dioxide will then be separated therefrom and recycled to the initial or partial reduction reactor.

The invention will now be described further with reference to the following examples which illustrate the initial or partial reduction step of the process of this invention.

EXAMPLE 1

In this example, a series of three runs are completed at a constant temperature. Methanol was used as the reducing agent in each of the three runs and each were completed at a different sulfur dioxide:methanol molar ratio. In each of the runs, a gas stream comprising 100 mole % sulfur dioxide was combined with a gas stream comprising 100 mole % methanol and then passed through a tubular reactor held at a temperature of about 1940° F. such that the holding time within the reactor and at the reaction temperature was about 1 second in each run. In the first run, hereinafter identified as 1(A), the sulfur dioxide and methanol were combined in a molar ratio of 1:1. In the second run, hereinafter referred to as 1(B), the sulfur dioxide and methanol were combined at a mole ratio of 1.2:1. In the third run, hereinafter identified as 1(C), the mole ratio of sulfur dioxide to methanol was 1.45:1. After the combined gas streams has passed through the reactor, the product gas stream was cooled so as to separate elemental sulfur and the uncondensed portion of the product gas stream analyzed to determine the amount of carbon monoxide, carbon dioxide, carbon oxysulfide, hydrogen sulfide and unreacted sulfur dioxide therein. The composition of the uncondensed portion of the product gas obtained from each of the runs is tabulated below:

TABLE

| Run No. | CO* | $CO_2$* | COS* | $H_2S$* | $SO_2$* |
|---|---|---|---|---|---|
| 1(A) | 0.222 | 0.363 | 0.087 | 0.328 | — |
| 1(B) | 0.214 | 0.392 | 0.083 | 0.286 | 0.023 |
| 1(C) | 0.095 | 0.513 | 0.096 | 0.168 | 0.128 |

*Composition is expressed on mol/mol of product gas basis.

As will be readily apparent from the tabulated data, the combined ratio of carbon oxysulfide and hydrogen sulfide to unreacted sulfur dioxide, on a molar basis, was about 2:1 in Run No. 1(C) and certainly was well within the range of that considered suitable or direct processing in a conventional Claus plant operation. As the ratio of sulfur dioxide to methanol in the feed, however, was reduced, the combined $H_2S+COS/SO_2$ ratio rapidly approached infinity. It should, then, be readily apparent that operation of the initial or partial reduction step must be controlled within a relatively narrow range of sulfur dioxide to alcohol. It should also be apparent that when a lower alcohol, particularly methanol, is used, a product gas directly suited for further treatment in a Claus plant type operation can be obtained. It should, however, be noted that in those cases where a desired ratio in the product gas is not obtained the same could be achieved in virtually all cases by either adding hydrogen sulfide or sulfur dioxide to the product gas stream as required. At this point, it should also be noted that while the relative concentration of carbon monoxide in the product gas stream is relatively high, all of the CO could be converted to carbon dioxide in an incineration step prior to venting the same to the atmosphere.

EXAMPLE 2

In this example, a run similar to those completed in Example 1 was completed except that a lower temperature; viz., 1920° F., was used. In this run, a gas stream containing 100 mole % $SO_2$ was combined with a gas stream comprising 100 mole % methanol such that the mole ratio of sulfur dioxide to methanol was 1.3:1 and the combined gas stream then passed through the same reactor is that used in the runs of Example 1. Again, the product gas stream from the reactor was cooled so as to separate sulfur and the uncondensed portion thereof then analyzed so as to determine the composition thereof. During the initial or partial reduction step, about 10 mole % of the feed sulfur dioxide was converted to sulfur and the uncondensed portion of the product gas stream has the following composition.

| Constituent | Moles/Mole of Product Gas |
|---|---|
| CO | 0.076 |
| $CO_2$ | 0.249 |
| COS | 0.048 |
| $H_2S$ | 0.103 |
| $SO_2$ | 0.052 |

As will be readily apparent from the tabulated data, the mole ratio of carbon oxysulfide plus hydrogen sulfide to unconverted sulfur dioxide in the uncondensed portion of the product gas was about 3:1. This is, of course, slightly high for direct feeding to a Claus plant, however, a 2:1 ratio could easily be obtained by bypassing the initial or partial reduction step with a portion of the sulfur dioxide feed.

EXAMPLE 3

A run similar to that of Example 2 was repeated except that the temperature actually used was about 1930° F. and the mole ratio of sulfur dioxide to methanol in the feed was about 1.66:1. In this particular example, about 10 mole % of the sulfur in the sulfur dioxide feed was converted to sulfur and the product gas had the following composition:

| Constituent | Moles/Mole of Product Gas |
|---|---|
| CO | 0.068 |
| $CO_2$ | 0.257 |
| COS | 0.045 |
| $H_2S$ | 0.039 |
| $SO_2$ | 0.245 |

As will be readily apparent, at this relatively high sulfur dioxide to methanol mole ratio in the feed, the mole ratio of the combined carbon oxysulfide and hydrogen sulfide to unconverted sulfur dioxide in the uncondensed portion of the product gas was only about 0.3 and the same is significantly below that generally considered satisfactory for treatment in a conventional Claus plant. Again, however, an adjustment could be made by adding hydrogen sulfide directly to the product stream. Nonetheless, the use of a high sulfur dioxide methanol ratio in the feed is not considered to be a preferred mode of operation in the present process.

From the foregoing examples, it should be readily apparent that lower, monohydric alcohols can effectively be used to convert at least a portion of a sulfur dioxide feed to sulfur and that the conditions of such reduction can be controlled such that the mole ratio of carbon oxysulfide and hydrogen sulfide to unconverted sulfur dioxide in the uncondensed portion of a product gas stream can be present in a relative ratio considered suitable for direct, subsequent treatment in a conventional Claus plant.

While the present invention has been described and illustrated by reference to particularly preferred embodiments thereof, it will be appreciated by those of ordinary skill in the art that the same lends itself to variations not necessarily illustrated herein. For this reason, then, reference should be made solely to the appended claims for purposes of determining the true scope of the present invention.

Having thus described and illustrated the present invention, what is claimed is:

1. A method for producing sulfur from sulfur dioxide comprising the step of contacting a gas stream comprising sulfur dioxide with a reducing gas comprising methanol under conditions such that at least a portion of the sulfur dioxide is converted to sulfur thermally.

2. The method of claim 1 wherein said partial reduction is accomplished thermally at a temperature above about 1000° F.

3. The method of claim 2 wherein said partial reduction is accomplished thermally at a temperature within the range from about 1500° to about 2200° F.

4. The method of claim 3 wherein the molar ratio of methanol to sulfur dioxide in the feed is within the range from about 0.5:1 to about 1:1.

5. The method of claim 4 wherein the molar ratio of methanol to sulfur dioxide in the feed is within the range from about 0.6:1 and 0.85:1.

6. A method for producing sulfur from sulfur dioxide comprising the steps of:
   (a) contacting a gas stream comprising sulfur dioxide with a reducing gas comprising methanol under conditions such that a portion of the sulfur in the sulfur dioxide feed is converted to elemental sulfur and another portion thereof converted to hydrogen sulfide;
   (b) withdrawing a product gas after said partial reduction comprising elemental sulfur and hydrogen sulfide and subjecting the same to a further treatment to produce still more sulfur.

7. The method of claim 6 wherein said initial or partial reduction is accomplished thermally at a temperature above about 1000° F.

8. The method of claim 7 wherein said initial or partial reduction is accomplished thermally at a temperature within the range from about 1500° to about 2200° F.

9. The method of claim 7 wherein the mole ratio of methanol to sulfur dioxide in the feed to the initial or partial reduction step is within the range from about 0.5:1 to about 1:1.

10. The method of claim 9 wherein the mole ratio of methanol to sulfur dioxide in the feed to the initial or partial reduction step is within the range from about 0.6:1 to about 0.85:1.

11. The method of claim 6 wherein said sulfur dioxide containing gas stream comprises at least 50 mole % sulfur dioxide.

12. The method of claim 6 wherein said product gas also comprises COS $H_2S$ and unconverted sulfur dioxide and the molar ratio of COS and $H_2S$ to unconverted sulfur dioxide is within the range of about 1.8 to about 2.2:1.

13. The method of claim 7 wherein between about 15 and 40% of the sulfur dioxide will be converted to sulfur, between about 10 and 30% will be converted to hydrogen sulfide and between about 15 and 35% will remain unconverted.

14. The method of claim 6 wherein said product gas is subjected to further treatment in a conventional Claus plant.

15. The method of claim 13 wherein about 35% of the sulfur dioxide will be converted to sulfur during the initial or partial reduction, about 45% will be converted to either hydrogen sulfur and/or carbon oxysulfide and about 21% will remain unconverted.

16. The method of claim 6 wherein said initial or partial reduction is accomplished catalytically at a temperature within the range from about 300° to about 2000° F.

17. The method of claim 6 wherein said initial or partial reduction is accomplished catalytically at a temperature within the range from about 500° to about 1200° F.

18. The method of claim 17 wherein said product gas also comprises COS and unconverted sulfur dioxide and the molar ratio of COS and $H_2S$ to unconverted sulfur dioxide is within the range from about 1.8:1 to about 2.2:1.

19. The method of claim 18 wherein said product gas is subjected to further treatment in a conventional Claus plant.

20. The method of claim 16 wherein the mole ratio of methanol to sulfur dioxide in the feed to the initial or partial reduction step is within the range from about 0.5:1 to about 1:1.

21. The method of claim 20 wherein the mole ratio of methanol to sulfur dioxide in the feed to the initial or partial reduction step is within the range from about 0.6:1 to about 0.85:1.

22. The method of claim 21 wherein said sulfur dioxide containing gas stream comprises at least 50 mole % sulfur dioxide.

23. The method of claim 16 wherein between about 15 and 40% of the sulfur dioxide will be converted to sulfur, between about 10 and 30% will be converted to hydrogen sulfide and between about 15 and 35% will remain unconverted.

24. The method of claim 23 wherein about 35% of the sulfur dioxide will be converted to sulfur during the initial or partial reduction, about 42% will be converted to either hydrogen sulfide and/or carbon oxysulfide and about 21% will remain unconverted.

25. A method for producing sulfur from sulfur dioxide comprising the steps of:
 (a) contacting a gas stream comprising sulfur dioxide with a reducing gas comprising methanol under conditions such that a portion of the sulfur in the sulfur dioxide feed is converted to elemental sulfur and another portion thereof converted to hydrogen sulfide;
 (b) withdrawing a product gas after said partial reduction comprising elemental sulfur and hydrogen sulfide and separating at least a portion of the elemental sulfur therefrom; and
 (c) subjecting the remaining portion of said product gas to a further treatment to produce still more sulfur.

26. A method for producing sulfur from sulfur dioxide comprising the step of contacting a gas stream comprising sulfur dioxide with a reducing gas comprising methanol such that at least a portion of the sulfur dioxide is reduced to sulfur catalytically.

27. The method of claim 26 wherein said partial reduction is accomplished catalytically at a temperature between about 300° and 2000° F.

28. The method of claim 27 wherein said partial reduction is accomplished catalytically at a temperature between about 500° F. and about 1200° F.

29. The method of claim 28 wherein the molar ratio of methanol to sulfur dioxide in the feed is within the range from about 0.5:1 to about 1:1.

* * * * *